Nov. 19, 1963  W. W. GRAY  3,111,029
COMPENSATED VERTICAL SPEED INDICATOR
Filed Jan. 27, 1961

Walter W. Gray  INVENTOR.

United States Patent Office 3,111,029
Patented Nov. 19, 1963

3,111,029
COMPENSATED VERTICAL SPEED INDICATOR
Walter W. Gray, Charlottesville, Va., assignor to Specialties, Incorporated, Syosset, N.Y.
Filed Jan. 27, 1961, Ser. No. 85,331
7 Claims. (Cl. 73—179)

This invention relates to flow meters including vertical speed indicators for use in aircraft.

In using vertical speed indicators of known type, including a vane rotatable in a cylindrical enclosure, difficulty has been experienced in that this type of instrument has not correctly measured or indicated vertical speed at all altitudes which are ordinarily reached in flying aircraft.

It is therefore an object of this invention to provide compensating means for vertical speed indicators to eliminate to large degree errors due to altitude changes.

Another object is to provide a vertical speed indicator of vane type having altitude compensating means of simple construction.

A further object is to provide altitude compensation means without moving parts, for vertical speed indicators of vane type.

Other objects will be evident in the accompanying description.

Figure 1:
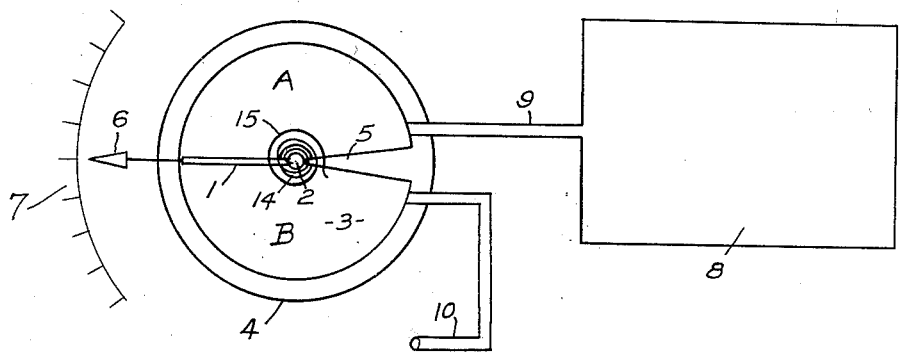
FIGURE 1 represents in schematic form a vane type vertical speed indicator.
Figure 2:
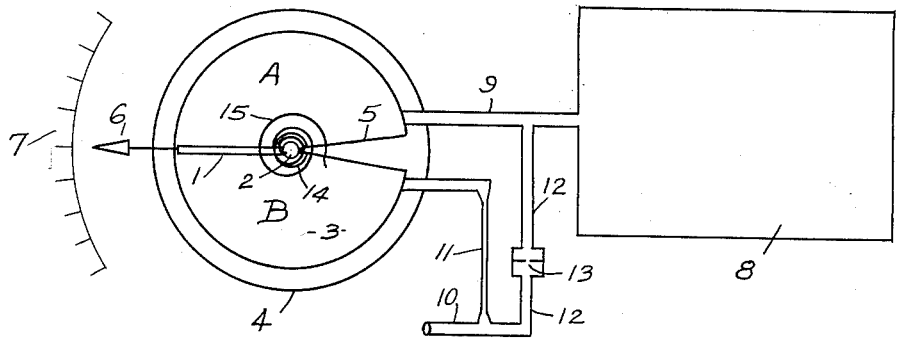
FIGURE 2 represents in schematic form the instrument of FIGURE 1 with the addition of my altitude compensation means.

In FIGURE 1 light weight vane 1 is fastened to shaft 2 which is rotatable in a bearing 14 in bottom plate 3 of cylindrical casing 4. The other end of shaft 2 is rotatable in a bearing in a cover plate, not shown. Metal wedge 5 is integral with casing 4 and is of the same height as this casing, so that a cover will make a close fit with respect to the wedge and casing. The sharp edge of wedge 5 closely approaches shaft 2. The upper edge of vane 1 is closely spaced from the cover plate and the lower edge of the vane is closely spaced from bottom plate 3. The outer edge of the vane closely approaches the inner cylindrical surface of casing 4 but does not touch this casing.

Pointer 6 moves with vane 1 and, in actual construction, is fastened to shaft 2 by means of an attached collar, or otherwise. This pointer is rotatable through an angle relative to scale 7 which may be calibrated in vertical speed in any desired units such as feet per minute or the like. This scale may be attached to the face plate or cover of the instrument. Spiral spring 15, attached to shaft 2 and to the cover, urges the vane and pointer to zero or predetermined position.

Small air reservoir or tank 8 comprises part of the instrument casing or it may be separate. It is preferable however to let the tank be a portion of the casing. This tank is connected with chamber A on one side of vane 1 by means of tube 9 passing through a suitable hole in the casing. Chamber B of the instrument, on the other side of vane 1, is connected to atmosphere by means of tube or conduit 10 which passes through a suitable hole in the casing. The end opening of tube 10 is so placed or directed that dynamic air pressure does not build up in the tube but only static pressure.

Vane 1 is normally yieldingly held in zero position shown by means of the light spiral spring 15, by a magnetic field, or in any suitable manner.

The instrument described is essentially a vane type vertical speed indicator as previously known. If the carrying aircraft rises the static pressure in tube 10 will be reduced so that air from tank 8 will flow into chamber A and past vane 1 thereby exerting torque to move the vane in counter clockwise direction until the torque is balanced by the opposite force of the spring or other means. Similarly, if the aircraft descends the static pressure is increased and air flows through tube 10 into chamber B from which it will flow past vane 1 and through tube 9 into tank 8, until there is again a balanced condition. In either case the pointer 6 will indicate vertical speed on scale 7. The foregoing description applies to prior vane type vertical speed indicators.

In my improved vertical speed indicator the components are the same as described above and the same construction is employed but, in addition, I include capillary tube 11 in tube or conduit 10 and I also include by-pass tube or conduit 12 connecting tubes 9 and 10 through thin wall orifice 13. The thin wall orifice by-passes the flow meter and the by-pass effect increases with altitude, thus partially correcting the tendency of the flow meter to over-indicate with an increase of altitude. In order to make the correction even more accurate the other element of the pneumatic network, the capillary restrictor or flow reducer 11 is added in series with the flow meter or vertical speed indicating instrument.

I have found that the above described improvements will provide a flow meter or vertical speed indicator of outstanding accuracy as compared to uncompensated instruments. By way of example, and not in a limiting sense, the orifice 13 can be about 0.008 inch in diameter and capillary tube 11 can be approximately 6 inches long and 0.06 inch in diameter. The casting 4 may be 0.3 inch deep and 0.87 inch inside diameter. The reservoir 8 may be approximately 22 cubic inches in interior volume. If the reservoir is made a part of the casing, the latter will of course be deeper but the bottom or partition 3 can still be at the same depth.

It is obvious that numerous changes of detail may be made without departing from general principles which I have disclosed.

What I claim is:

1. In a vane type flow meter including a rotatable vane in a chamber and an air reservoir connected thereto, a conduit connecting said reservoir and said chamber, another conduit connecting said chamber and the atmosphere, a conduit having an orifice therein for bypassing said chamber with air flowing between said reservoir and said other conduit, and a conduit of restricted cross section connecting said chamber and said other conduit.

2. In a vertical speed indicator, a casing having a cylindrically curved inner surface, a vane rotatable within said casing and adjacent to said curved surface, a partition dividing space within said casing into a first chamber on one side of said vane and a second chamber on the other side of said vane, means mounting said vane for rotation, yielding means for opposing rotation of said vane, means moved by said vane for indicating vertical speed, a reservoir for air, a conduit connecting said reservoir and said first chamber, conduit means including a flow reducing portion connecting said second chamber with the atmosphere, and conduit means including a wall having an orifice bypassing said chambers and conducting air between said reservoir and the atmosphere.

3. The vertical speed indicator as described in claim 2, said wall being a thin wall.

4. In a fluid flow meter, a casing having a cylindrically curved inner surface, a vane rotatable within said casing and adjacent to said curved surface, a partition dividing space within said casing into a first chamber on one side of said vane and partition and a second chamber on the other side of said vane and partition, means mounting said vane for rotation, yielding means urging said vane to predetermined position, means moved as a result of movement of said vane for indicating fluid flow, a reservoir for fluid, a conduit connecting said reservoir and said first chamber, conduit means including a flow restricting portion connecting said second chamber with a supply of fluid, and conduit means including an orifice by-passing said chambers and conducting fluid between said reservoir and said fluid supply.

5. The flow meter as described in claim 4, said orifice being in a relatively thin wall in said last named conduit means.

6. The flow meter as described in claim 4, said flow restricting conduit portion being approximately six inches long and approximately one sixteenth inch in diameter, and said orifice being approximately eight thousandths of an inch in diameter.

7. The flow meter as described in claim 4, said flow meter indicating vertical speed, and said supply of fluid being the atmosphere.

References Cited in the file of this patent

UNITED STATES PATENTS

| | | |
|---|---|---|
| 2,240,750 | Bestelmeyer | May 6, 1941 |
| 2,297,408 | Hordebeck | Sept. 29, 1942 |
| 2,458,331 | Borell | Jan. 4, 1949 |
| 2,973,643 | Roderick et al. | Mar. 7, 1961 |

OTHER REFERENCES

Publication: "Instruments and Automation" (vol. 27, November 1954, pages 1810, 1811), an article on effect of edge thickness on Small Orifice Meters," by Thrasher and R. C. Binder.